United States Patent
Osborn

(10) Patent No.: US 9,826,457 B1
(45) Date of Patent: *Nov. 21, 2017

(54) SYSTEM AND METHOD FOR PROVIDING EXTENDING FEMTOCELL COVERAGE

(71) Applicant: OPEN INVENTION NETWORK LLC, Durham, NC (US)

(72) Inventor: Christopher Martin Edward Osborn, Allen, TX (US)

(73) Assignee: Open Invention Network, LLC, Durham, NC (US)

( * ) Notice: Subject to any disclaimer, the term of this patent is extended or adjusted under 35 U.S.C. 154(b) by 24 days.

This patent is subject to a terminal disclaimer.

(21) Appl. No.: 14/982,686

(22) Filed: Dec. 29, 2015

Related U.S. Application Data

(63) Continuation of application No. 14/090,103, filed on Nov. 26, 2013, now Pat. No. 9,232,545, which is a continuation of application No. 12/905,321, filed on Oct. 15, 2010, now Pat. No. 8,600,386.

(60) Provisional application No. 61/251,762, filed on Oct. 15, 2009.

(51) Int. Cl.
*H04W 4/00* (2009.01)
*H04W 36/00* (2009.01)
*H04W 40/02* (2009.01)
*H04W 60/00* (2009.01)

(52) U.S. Cl.
CPC .......... *H04W 40/02* (2013.01); *H04W 60/00* (2013.01)

(58) Field of Classification Search
CPC ....... H04W 4/00; H04W 4/001; H04W 4/003; H04W 4/008; H04W 4/02
See application file for complete search history.

(56) References Cited

U.S. PATENT DOCUMENTS

| | | | | |
|---|---|---|---|---|
| 7,454,210 | B2 * | 11/2008 | Rinne | H04W 36/12 455/442 |
| 2003/0224795 | A1 * | 12/2003 | Wilhoite | H04W 40/38 455/445 |
| 2007/0110015 | A1 * | 5/2007 | Chakraborty | H04B 7/022 370/338 |
| 2008/0132239 | A1 * | 6/2008 | Khetawat | H04W 36/12 455/438 |
| 2008/0247388 | A1 * | 10/2008 | Horn | H04L 41/5006 370/389 |
| 2008/0254797 | A1 * | 10/2008 | Achtari | H04W 36/0083 455/436 |
| 2008/0261602 | A1 * | 10/2008 | Livneh | H04W 28/0289 455/442 |
| 2009/0111468 | A1 * | 4/2009 | Burgess | H04W 36/14 455/436 |
| 2010/0105404 | A1 * | 4/2010 | Palanki | H04L 1/0025 455/450 |

(Continued)

*Primary Examiner* — San Htun
(74) *Attorney, Agent, or Firm* — Haynes and Boone, LLP

(57) ABSTRACT

Femtocell coverage can be extended across a coverage area by providing a cluster of femtocell access points (FAPs). Each FAP is independently registered with a core network and provisioned with a location area code common to each FAP. At hand-in from the macrocell network, an association is made between the mobile station and the hand-in FAP, which becomes an anchor FAP for the duration of the mobile station's presence within the cluster. Calls between the mobile station and the core network are routed via a servicing FAP of the cluster and the anchor FAP.

20 Claims, 12 Drawing Sheets

(56) References Cited

U.S. PATENT DOCUMENTS

2010/0197309 A1* 8/2010 Fang .................. H04W 36/04
 455/436

* cited by examiner

SYSTEM AND METHOD FOR PROVIDING EXTENDING FEMTOCELL COVERAGE

CROSS REFERENCE TO RELATED APPLICATIONS

This application claims priority from and is a continuation of U.S. application Ser. No. 14/090,103, filed Nov. 26, 2013, entitled SYSTEM AND METHOD FOR PROVIDING EXTENDING FEMTOCELL COVERAGE, issued U.S. Pat. No. 9,232,545, issued Jan. 5, 2016, which is a continuation of U.S. application Ser. No. 12/905,321, filed Oct. 15, 2010, entitled SYSTEM AND METHOD FOR PROVIDING EXTENDING FEMTOCELL COVERAGE, issued U.S. Pat. No. 8,600,386, issued Dec. 3, 2013, which claims priority from U.S. Provisional application Ser. No. 61/251,762, entitled CLUSTERING CONCEPTS, filed Oct. 15, 2009. The above applications are incorporated herein by reference.

FIELD OF THE INVENTION

The present invention is generally related to radio access technologies and, more particularly, to mechanisms for facilitating broader coverage.

BACKGROUND OF THE INVENTION

Contemporary cellular radio systems, or mobile telecommunication systems, provide an over-the-air interface to wireless mobile stations (MSs), also referred to as user equipments (UEs), via a radio access network (RAN) that interfaces with at least one core network. The RAN may be implemented as, for example, a CDMA2000 RAN, a Universal Mobile Telecommunications System (UMTS) RAN, a Global System for Mobile communications (GSM) RAN, or another suitable radio access network implementation. The MSs may comprise, for example, a mobile terminal such as a mobile telephone, a laptop computer featuring mobile telephony software and hardware, a personal digital assistant (PDA), or other suitable equipment adapted to transfer and receive voice or data communications with the radio access network.

A RAN covers a geographical area comprised of any number of cells each comprising a relatively small geographic area of radio coverage. Each cell is provisioned by a cell site that includes a radio tower, e.g., a base transceiver station (BTS), and associated equipment. BTSs communicate with MSs over an air interface within radio range of the BTSs.

Numerous BTSs in the RAN may be communicatively coupled to a base station controller (BSC), also commonly referred to as a radio network controller (RNC). The BSC manages and monitors various system activities of the BTSs serviced thereby. BSCs are typically coupled with at least one core network.

BTSs are typically deployed by a carrier network in areas having a high population density. The traffic capacity of a cell site is limited by the site's capacity and affects the spacing of cell sites. In suburban areas, sites are often up to two miles apart, while cell sites deployed in dense urban areas may be as close as one-quarter of a mile apart. Because the traffic capacity of a cell site is finitely limited, as is the available frequency spectrum, mobile operators have a vested interest in technologies that allow for increased subscriber capacity.

A microcell site comprises a cell in a mobile phone network that covers a limited geographic area, such as a shopping center, hotel, airport, or other infrastructure that may have a high density mobile phone usage. A microcell typically uses power control to limit the radius of the microcell coverage. Typically a microcell is less than a mile wide.

Although microcells are effective for adding network capacity in areas with high mobile telephone usage, microcells extensively rely on the RAN, e.g., a controlling BSC and other carrier functions. Because contemporary BSCs have limited processing and interface capacity, the number of BTSs—whether microcell BTSs or typical carrier BTSs—able to be supported by the BSC or other RAN functions is disadvantageously limited.

Contemporary interest exists in providing enterprise and office access, including small office/home office (SOHO) radio access, by an even smaller scale BTS. The radio coverage area of such a system is typically referred to as a femtocell. A femtocell typically provides radio network access on an over-the-air interface to mobile stations within its coverage area and connects to the service provider's network via broadband (such as DSL or cable). A femtocell thus allows service providers to extend service coverage indoors, especially where access would otherwise be limited or unavailable. Current designs typically support 2 to 4 active mobile phones in a residential setting, and 8 to 16 active mobile phones in enterprise settings.

In a system featuring a femtocell, an MS may be authorized to operate in the femtocell when proximate the femtocell system, e.g., while the MS is located in the SOHO. When the MS moves beyond the coverage area of the femtocell, the MS may then be serviced by the carrier network. The advantages of deployment of femtocells are numerous. For instance, mobile users frequently spend large amounts of time located at, for example, home, and many such users rely extensively on cellular network service for telecommunication services during these times. For example, a recent survey indicated that nearly thirteen percent of U.S. cell phone customers do not have a landline telephone and rely solely on cell phones for receiving telephone service. From a carrier perspective, it would be advantageous to have telephone services provisioned over a femtocell system in which the main communication bandwidth is performed over the IP network, e.g., deployed in the user's home, to thereby reduce the load and effectively increase the capacity on the carrier RAN infrastructure.

One disadvantage of existing femtocell systems is that each femtocell is limited to a very limited geographic area, making the femtocell system inconvenient for deployment in larger enterprises. What is required is a system and method for providing expanded coverage using the femtocell concepts.

SUMMARY OF THE INVENTION

Femtocell coverage can be extended across a coverage area by providing a cluster of femtocell access points (FAPs). Each FAP may be independently registered with a core network and may be provisioned with a location area code common to each FAP. At hand-in of a mobile station from the macrocell network, an association is made between the mobile station and the hand-in FAP, which may be maintained as an anchor FAP for the duration of the mobile station's presence within the cluster. Calls between the mobile station and the core network may be routed via a servicing FAP of the cluster and the anchor FAP.

In one aspect of the disclosure, there is provided a method for configuring a wireless network. A plurality of access points may be provided with a plurality of coverage areas. Each access point may be configured to provide radio network access via an air interface to at least one mobile station and communicate with a core network via an IP network. At least one of the plurality of access points may be configured to perform a hand-in of a mobile station from a macrocell network comprising. The hand-in process may comprise registering an association between the mobile station and an access point with the core network, the associated access point defining an anchor access point for the respective mobile station. The association may also be stored within the network. The method may further comprise defining a cluster of the plurality of access points, independently registering each access point of the cluster with the core network, and configuring each access point of the cluster for peer to peer communication with at least one other access point of the cluster. The plurality of cluster access points may be configured to identify an anchor point for a mobile station when a communication requirement between the core network and the mobile station exists and establish a communication between the mobile station and the core network via the anchor access point irrespective of an access point of the cluster that is servicing the mobile station.

In one aspect of the disclosure, there is provided a method for establishing a communication between a core network and a mobile station on a radio access network comprising a plurality of access points, each access point configured to provide radio network access via an air interface to the mobile station, each access point configured to communicate with the core network via an IP network, and each access point being independently registered with the core network. The method may comprise indicating to the core network an association between the mobile station and an anchor access point of the cluster, determining a communication requirement between the core network and the mobile station, determining a servicing access point of the cluster able to service the mobile station, and establishing a connection path between the core network and the mobile station comprising the anchor access point and the servicing access point.

In one aspect of the disclosure, there is provided a system comprising a plurality of access points defining a cluster of access points, each access point of the cluster comprising a common location area code. Each access point of the cluster may be configured to provide radio network access via an air interface to at least one mobile station within a coverage area, communicate with a core network via an IP network with each access point of the cluster being independently registered with the core network, provide peer to peer communication with at least one other access point of the cluster. At least one of the access points of the cluster may be configured to perform a hand-in of a mobile station from a macrocell network comprising registering with the core network an association between the mobile station and an access point of the cluster, the associated access point defining an anchor access point for the respective mobile station, and storing an association between the mobile station and the anchor access point within the cluster. At least one access point of the cluster may be configured to determine a communication requirement for a mobile station within a coverage area of the cluster, identify an anchor access point for the mobile station, and establish a communication between the mobile station and the core network via the anchor access point.

BRIEF DESCRIPTION OF THE DRAWINGS

Reference will now be made, by way of example only, to specific embodiments and to the accompanying drawings in which.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
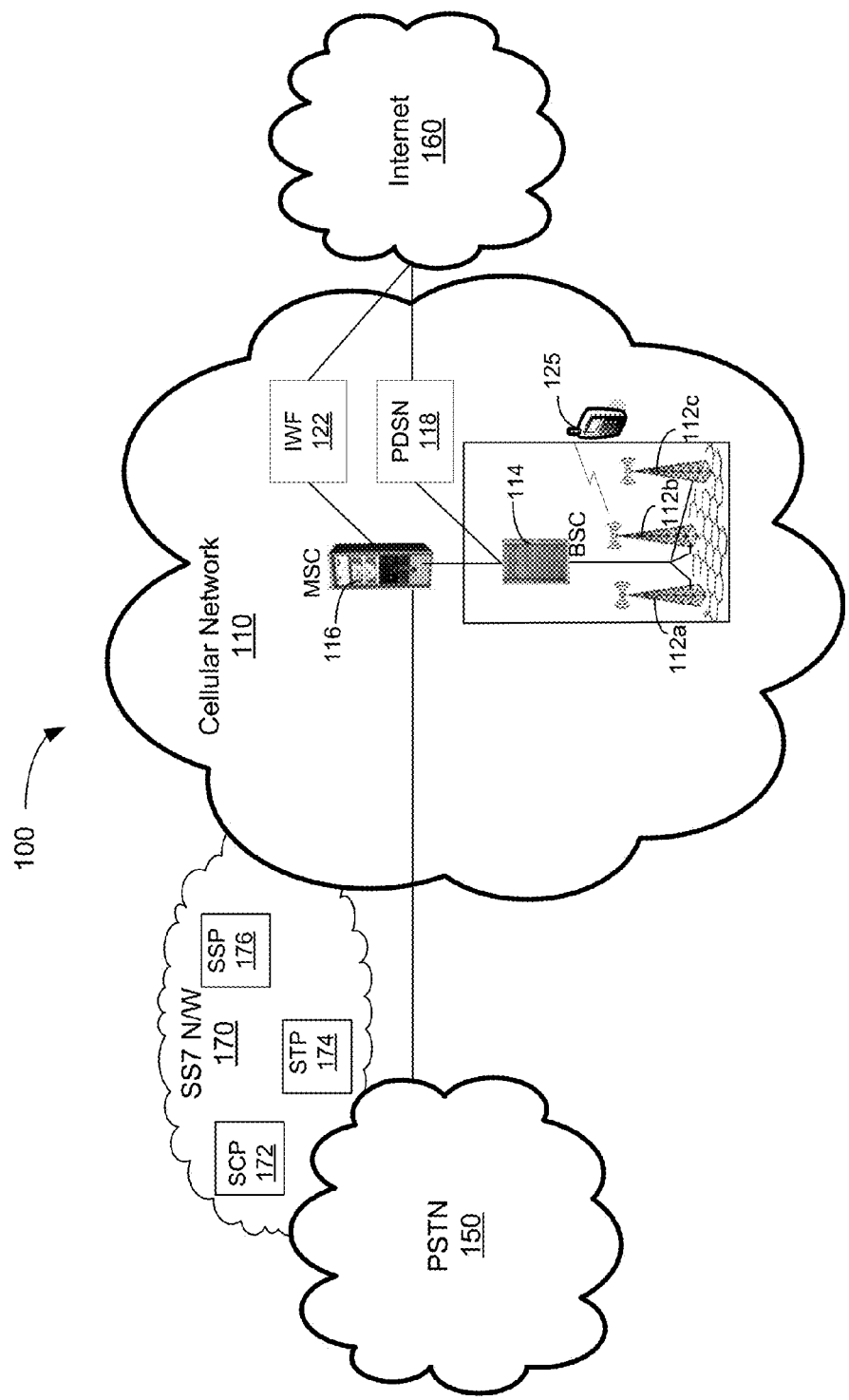
FIG. 1 is a diagrammatic representation of a network system that includes a cellular network adapted to provide macro-cellular coverage to a mobile station.

FIG. 1 is a diagrammatic representation of a network system 100 that includes a cellular network 110 adapted to provide macro-cellular coverage to a mobile station. Cellular network 110 may comprise, for example, a code-division multiple access (CDMA) network, such as a CDMA-2000 network.

Cellular network 110 may include any number of base transceiver stations (BTSs) 112a-112c communicatively coupled with a base station controller (BSC) 114 or RNC. Each individual BTS 112a-112c under the control of a given BSC may define a radio cell operating on a set of radio channels thereby providing service to an MS 125, such as a mobile terminal. Each BTS will typically have a uniquely associated location area indicator. BSC 114 manages the allocation of radio channels, receives measurements from mobile terminals, controls handovers, as well as various other functions as is understood. BSC 114 is interconnected with a Mobile Switching Center (MSC) 116 that provides mobile terminal exchange services. BSC 114 may be additionally coupled with a packet data serving node (PDSN) 118 or other gateway service that provides a connection point between the CDMA radio access network and a packet network, such as Internet 160, and provides mobility management functions and packet routing services. MSC 116 may communicatively interface with a circuit switched network, such as the public switched telephone network (PSTN) 150, and may additionally be communicatively coupled with an interworking function (IWF) 122 that provides an interface between cellular network 110 and PSTN 150.

System 100 may also include a signaling system, such as a signaling system #7 (SS7) network 170. SS7 network 170 provides a set of telephony signaling protocols which are used to set up the vast majority of the world's PSTN telephone calls. SS7 network 170 is also used in cellular networks for circuit switched voice and packet-switched data applications. As is understood, SS7 network 170 includes various signaling nodes, such as any number of service control points (SCPs) 172, signal transfer points (STPs) 174, and service switching points (SSPs) 176.

BTSs 112*a*-112*c* deployed in cellular network 110 may service numerous network 110 subscribers. Cell cites provided by BTSs 112*a*-112*c* commonly feature site ranges of a quarter to a half mile, e.g., in densely populated urban areas, to one to two miles in suburban areas. In other remotely populated regions with suitable geography, site ranges may span tens of miles and may be effectively limited in size by the limited transmission distance of relatively low-powered MSs. As referred to herein, a cell provided by a BTS deployed in carrier network 110 for access by any authorized network 110 subscriber is referred to as a macrocell.

Figure 2:
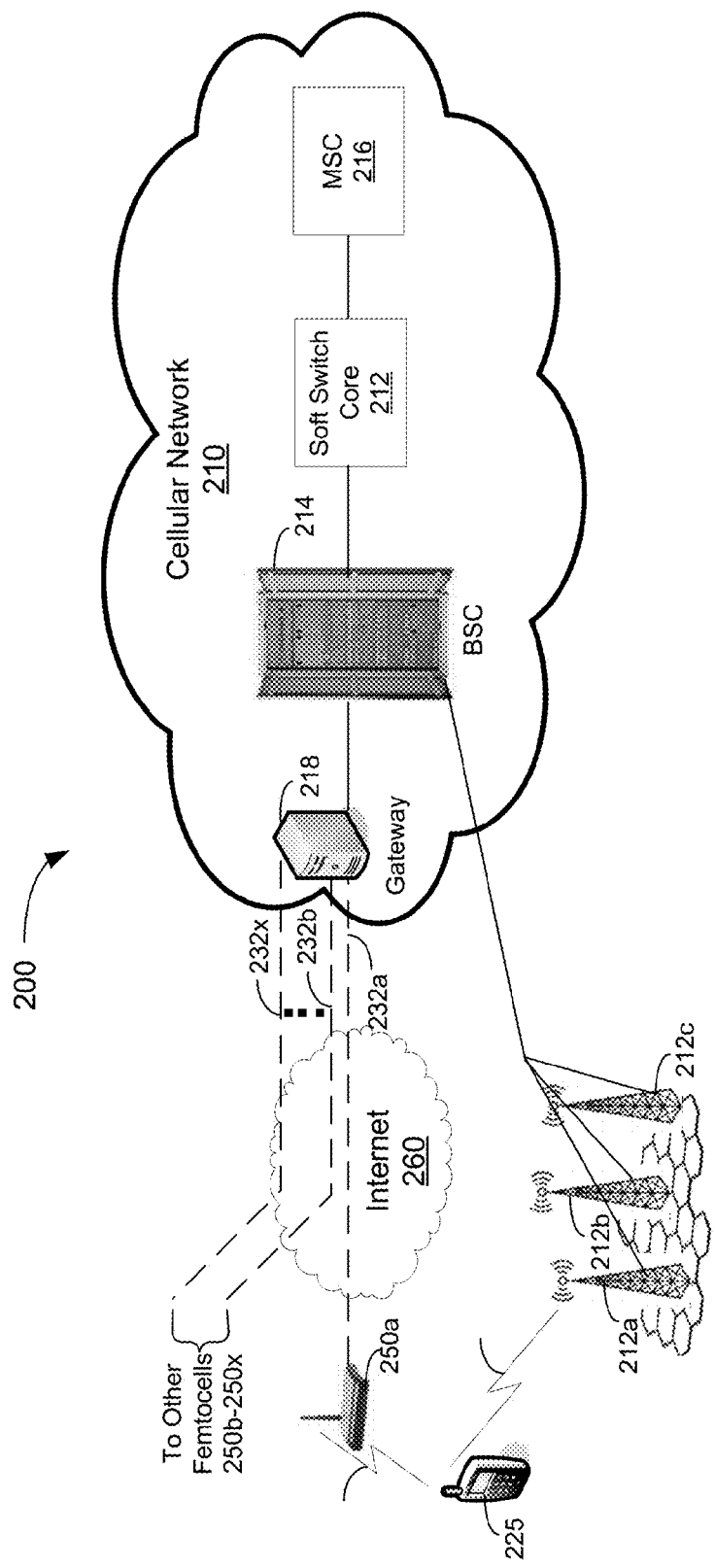
FIG. 2 is a diagrammatic representation of a conventional network system configuration featuring a femtocell system.

FIG. 2 is a diagrammatic representation of a conventional network system 200 configuration featuring a femtocell. In the depicted example, a central BSC 214 deployed in a cellular carrier network 210 may connect with a soft switch core 212 that is connected with a MSC 216. MSC 216 connects with the cellular core network and may interface with other networks, such as the PSTN as is understood. BSC 214 may be connected with and service numerous BTSs 212*a*-212*c* that provide macrocells to cellular network 210 subscribers.

BSC 214 may additionally connect with a tunnel gateway system 218 that is adapted to establish secured tunnels 232*a*-232*x* with respective femtocell systems 250*a*-250*x*. Femtocells comprise cellular access points that connect to a mobile operator's network using, for example, a residential Digital Subscriber Line (DSL) or cable broadband connection. Femtocells 250*a*-250*x* provide a radio access point for MS 225 when the MS is within range of a femtocell system with which the MS has authorized access. For example, femtocell system 250*a* may be deployed in a residence of the user of MS 225. Accordingly, when the user is within the residence, mobile telecommunications may be provided to MS 225 via an air-interface provided by femtocell system 250*a*. In this instance, MS 225 is effectively offloaded from the macro BTS, e.g., BTS 212*a*, and communications to and from the MS are carried out with femtocell system 250*a* over Internet 260. Thus, femtocell systems 250*a*-250*x* may reduce the carrier radio resource demands by offloading MSs from macrocells to femtocells and thereby provide for increased subscriber capacity of cellular network 210.

In contemporary implementations such as that depicted in FIG. 2, a femtocell system 250*a* comprises a transceiver without intelligence and is thus required to be connected and managed by BSC 214. Thus, femtocell systems 250*a*-250*x* are reliant on the carrier network centralized BSC 214 which has limited capacity and thus does not exhibit desirable scaling characteristics or capabilities. Moreover, high communications overhead are realized by the BTS backhaul.

Figure 3A:
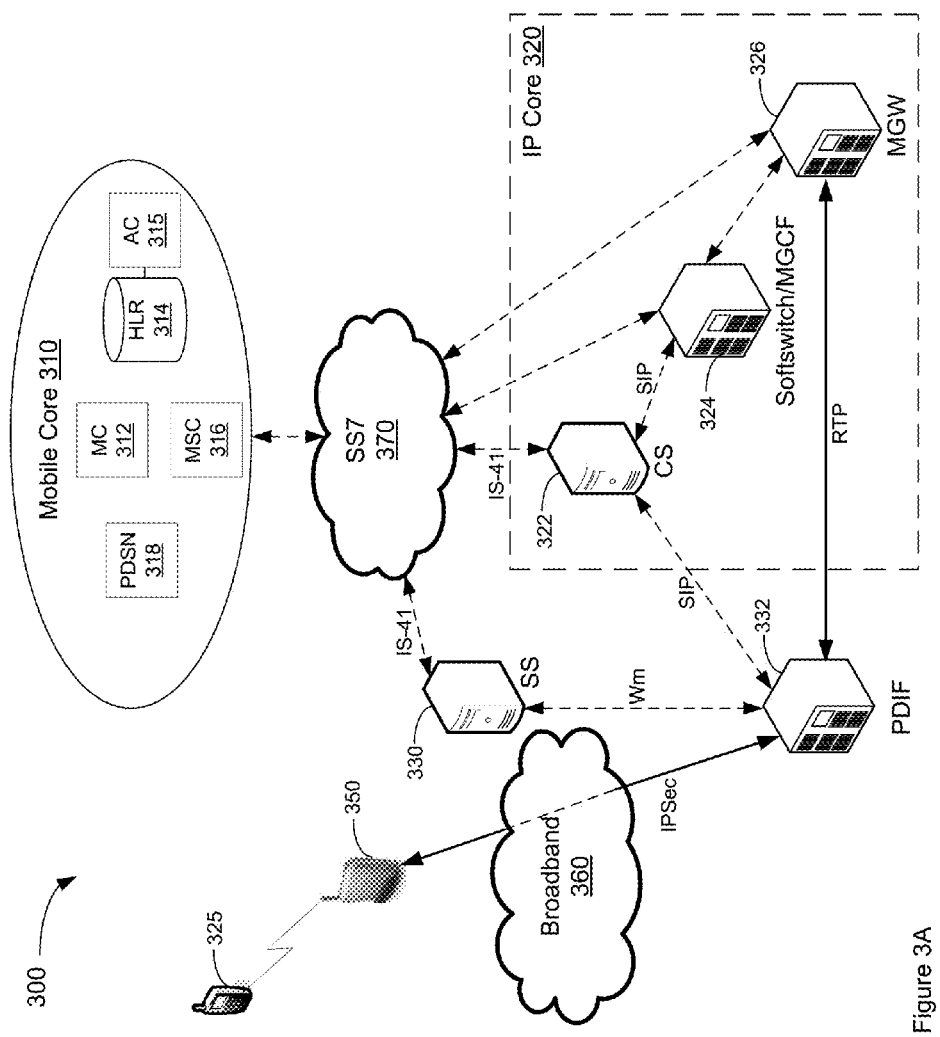
FIG. 3A is a diagrammatic representation of a network system in which a femtocell system implemented in accordance with an embodiment of the invention may be deployed.

FIG. 3A is a diagrammatic representation of a network system 300 in which a femtocell system may be deployed. System 300 includes a mobile core network 310 implemented as, for example, a code division multiple access (CDMA) core network that interfaces with a SS7 network 370. Mobile core network 310 may include a Messaging Center (MC) 312, a Home Location Register (HLR) 314, an authentication center (AC) 315, a Mobile Switching Center (MSC) 316, a Packet Data Serving Node (PDSN) 318, and various other components. The HLR 314 is a central database that contains details of each MS subscriber authorized to use the mobile core network 310. There may be several HLRs deployed in the core network 310. The HLR 314 maintains details of each Subscriber Identity Module (SIM) card issued by the mobile network operator, e.g., the International Mobile Subscriber Identity (IMSI) stored in the SIM card, services authorized for the associated user, a location of the MS, and various other information. The HLR 314 may interface with the AC 315 that functions to facilitate authentication of MSs that access the cellular network. The MSC 316 provides mobile terminal exchange services and may communicatively interface with a circuit switched network, such as the public switched telephone network. The MSC 316 handles voice calls and Short Message Service (SMS), sets up and releases end-to-end connections, and handles mobility and hand-over requirements during calls as well as other functions. The PDSN 318 provides an interface between the radio access and IP networks. The PDSN 318 provides, for example, mobility management functions and packet routing functionality.

System 300 includes an Internet Protocol (IP) core network 320 that interfaces with the SS7 network 370, e.g., via IS-41. In accordance with an embodiment, the IP core network 320 includes a convergence server (CS) 322, a softswitch/Media Gateway Controller Function (MGCF) 324, and a Media Gateway (MGW) 326 among other components. The CS 322 may be communicatively coupled with the SS7 network 370 and a Packet Data Interworking Function (PDIF) 332, e.g., via Session Initiation Protocol (SIP) communications. The CS 322 provides SIP registration functions and a central interface point to Voice over Internet Protocol (VoIP) elements and the softswitch/MGCF 324. The CS 322 further provides SIP-MSC and Interworking functions between existing VoIP network elements and the operator's core network. To this end, the CS 322 may interface directly with the MC 312 and the HLR 314 using, for example, a TIA-41 interface.

The softswitch/MGCF 324 may be communicatively coupled with the CS 322, e.g., via SIP communications, with the SS7 network 370, and with the MGW 326. The softswitch/MGCF 324 may connect calls from one device to another and perform call control protocol conversion, for example, between SIP and ISDN User Part (ISUP). The MGW 326 may be communicatively coupled with the SS7 network 370 and the PDIF 332 in addition to the softswitch/MGCF 324. The MGW 326 may convert data between real-time transport protocol (RTP) and pulse code modulation (PCM), and may also be employed for transcoding. Resources of the MGW 326 may be controlled by the softswitch/MGCF 324.

In accordance with an embodiment, the system 300 may include a Security Server (SS) 330 that interfaces with the SS7 network 370, e.g., via IS-41, and the PDIF 332, e.g., via a Wm interface. The PDIF 332 facilitates access to the IP core network 320 via WiFi access points and may be responsible for such services as, for example, security, access, authentication, policy enforcement, user information collection, and IP address allocation as well as other services. The PDIF 332 may interface, e.g., via SIP communications, with the CS 322, and may have Real-time Transport Protocol (RTP) communications with the MGW 326. Further, the PDIF 332 may have secured IP communications, e.g., IPSec, established with one or more femtocell systems, e.g., a femtocell system 350 deployed at a user premise, such as a home office. The secured communications may be established between the PDIF 332 and the femtocell system 350 over, for example, a broadband network 360 interface such as a residential DSL or cable broadband connection. The femtocell system 350, in turn, provides radio access for one or more MSs 325 within the coverage area of the femtocell system 350 with which the MS 325 has authorized access.

Femtocell system 350 provides an IP-accessible radio access network, is adapted for operation with IP core network 320, and provides radio link control functions. Femtocell system 350 may be communicatively coupled with broadband network 360 via any variety of backhaul technologies, such as an 802.11x link, a 10/100 BaseT LAN link, a T1/E1 Span or fiber, cable set top box, DSL modem connected with a central office digital subscriber line access multiplexer, a very small aperture terminal (VSAT), or another suitable backhaul infrastructure.

In an embodiment, femtocell system 350 includes a session initiation protocol (SIP) adapter that supports a SIP client pool and provides conversion of call set-up functions to SIP client set-up functions. To this end, the femtocell system 350 may be allocated an IP address. Additionally, femtocell system 350 includes electronic serial number (ESN) screening and/or Mobile Equipment Identifier (MEID) screening to allow only designated MSs to access the femtocell. Configuration of the femtocell system 350 with ESN(s) or MEID(s) may be made as part of an initial femtocell system 350 activation.

In another embodiment, a femtocell system 350 may be implemented as a 3G-compliant entity, e.g., to service UMTS mobile terminals, and may be deployed in a small office/home office (SOHO) or other suitable enterprise. To this end, the femtocell system 350 may include an integrated RNC and radio node (RN). In a particular implementation, the femtocell system 350 may be implemented as an Evolution-Data Optimized (EV-DO) entity, e.g., a 1×EV-DO integrated IP-RAN. The femtocell system 350 provides an IP-accessible radio access network and provides radio link control functions.

Figure 3B:
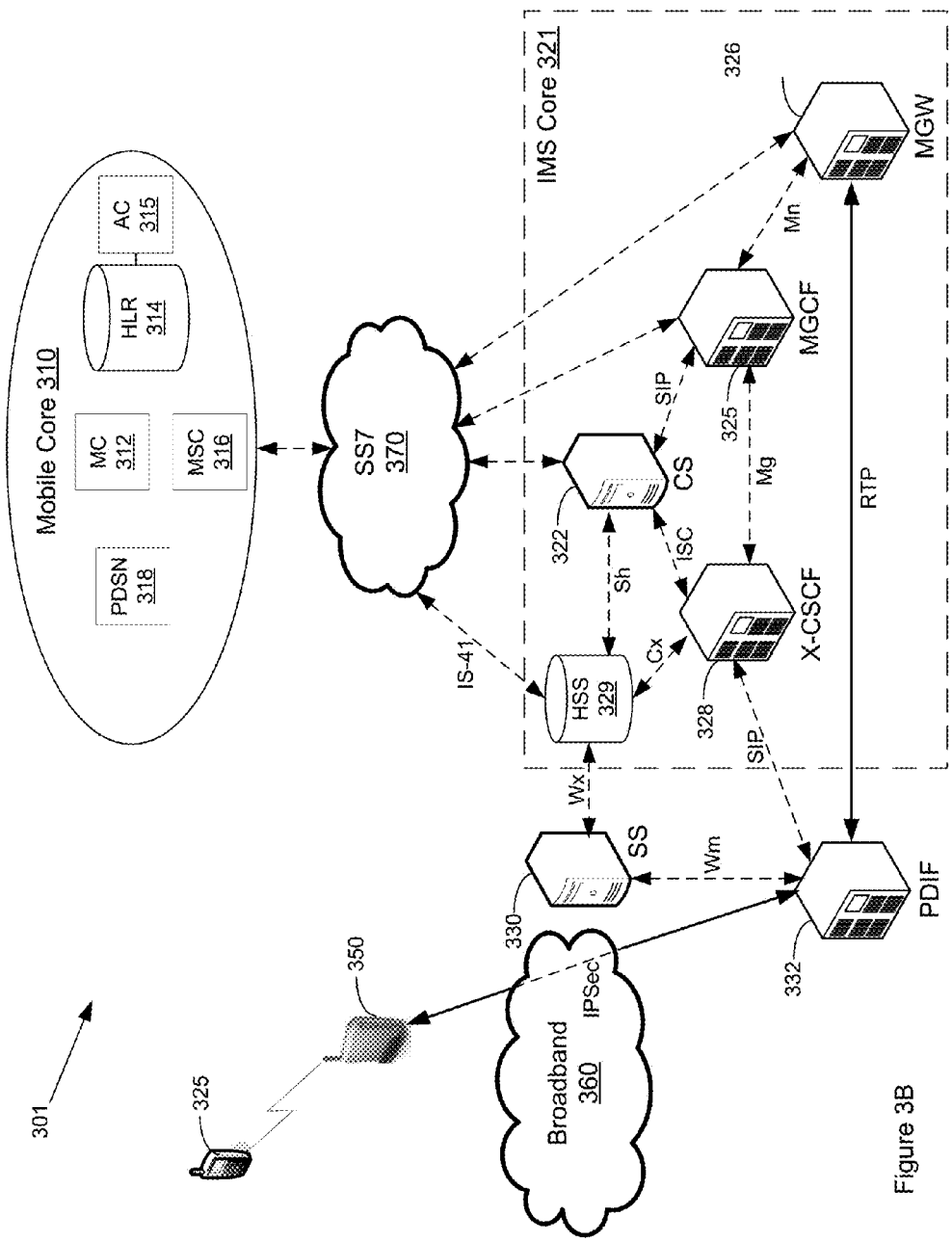
FIG. 3B is a diagrammatic representation of an alternative network system in which a femtocell system implemented in accordance with an embodiment of the invention may be deployed.

FIG. 3B is a diagrammatic representation of an alternative network system 301 in which a femtocell system implemented in accordance with an embodiment of the invention may be deployed. System 301 includes a mobile core network 310 implemented as, for example, a CDMA core network that interfaces with a SS7 network 370. The mobile core network 310 may include an MC 312, an HLR 314, an AC 315, an MSC 316, and a PDSN 318, and various other components as described above with regard to the mobile core network 310 of FIG. 3A.

System 301 includes an IP Multimedia Subsystem (IMS) core network 321 that interfaces with the SS7 network 370. In accordance with an embodiment, the IMS core network 321 includes a CS 322, a MGCF 325, an MGW 326, an X-Call Session Control Function (X-CSCF) 328, and a Home Subscriber Server (HSS) 329 among other components. The X-CSCF 328 processes SIP signaling packets and provides a centralized interface for control and signaling including SIP registration functions in accordance with disclosed embodiments. The X-CSCF 328 may provide Interrogating-CSCF (I-CSCF) services, Proxy-CSCF (P-CSCF) services, and Serving-CSCF (S-CSCF) services. The X-CSCF 328 comprises various SIP servers or proxies that process SIP signaling packets in the IMS core network 321. P-CSCF services provided by X-CSCF may include provisioning a first point of contact for an IMS-compliant MS. In such a situation, the X-CSCF may be located in a visited network or in an MS's home network if the visited network is not fully IMS-compliant. An MS may discover the X-CSCF 328, e.g., by using Dynamic Host Configuration Protocol (DHCP), or by assignment in a packet data protocol context. S-CSCF services provided by the X-CSCF 328 include provisioning as a central node of the signaling plane. To this end, the S-CSCF comprises a SIP server, but additionally performs session control. Further, the X-CSCF 328 is interfaced with the HSS 329 and/or HLR 314 to download and upload user profiles for providing S-CSCF services. The X-CSCF 328 further includes a SIP function for providing I-CSCF services. To this end, the X-CSCF 328 has an IP address that is published in the Domain Name System (DNS) that facilitates location of the X-CSCF 328 by remote servers. Thus, I-CSCF services of the X-CSCF 328 may be used as a forwarding point for receipt of SIP packets within the domain.

The CS 322 may be configured to operate as an IMS application server that interfaces with the X-CSCF 328 using the ISC interface. The HSS 329 comprises a user database that supports IMS network entities that manage or service calls. The HSS 329 contains subscription-related information, e.g., subscriber profiles, may perform authentication and authorization of users, and may provide information about locations of MSs and IP information. In a fully standard IMS architecture, the CS 322 may interface with the HSS 329. However, in other scenarios, the HLR 314 may anchor the service even with the HSS 329 deployed within the system 301. Accordingly, the CS 322 may be communicatively interfaced with the HLR 314 for location updates using, for example, a TIA-41 interface. Further, the CS 322 is preferably interfaced with the MC 312 using, for example, a TIA-41 interface.

The CS 322 may be communicatively coupled with the SS7 network 370, the MGCF 325, e.g., via SIP communications, the X-CSCF 328, e.g., via ISC, and the HSS 329, e.g., via an Sh interface. The MGCF 325 may be communicatively coupled with the MGW 326, e.g., via an Mn interface, the X-CSCF 328, e.g., via an Mg interface, and the SS7 network 370 in addition to the CS 322. The MGW 326 may be communicatively coupled with the SS7 network 370 and a PDIF 332 in addition to the MGCF 325. The MGW 326 may convert data between RTP and PCM, and may also be employed for transcoding. Resources of the MGW 326 may be controlled by the MGCF 325. The X-CSCF 328 may be communicatively coupled with the PDIF 332 for exchanging SIP communications therewith and the HSS 329, e.g., via a Cx interface, in addition to the CS 322 and the MGCF 325. The HSS 329 may be communicatively coupled with the SS7 network 370, e.g., via IS-41, and a SS 330, e.g., via a Wx interface. The SS 330 may be coupled with the PDIF 332, e.g., via a Wm interface.

The PDIF 332 facilitates access to the IMS core network 321 via WiFi access points and may be responsible for such services as, for example, security, access, authentication, policy enforcement, user information collection, and IP address allocation as well as other services. The PDIF 332 may have RTP communications with the MGW 326. Further, the PDIF 332 may have secured IP communications, e.g., IPSec, established with one or more femtocell systems, e.g., a femtocell system 350 deployed at a user premise, such as a home office. The secured communications may be established between the PDIF 332 and the femtocell system 350 over, for example, a broadband network 360 interface such as residential DSL or cable broadband connection. The femtocell system 350, in turn, provides a radio access point for one or more MSs 325 when the MS 325 is within range of the femtocell system 350 with which the MS 325 has authorized access.

An embodiment of the Femtocell system will now be described with reference to FIG. 4. The Femtocell system 350 may include a cluster of access points 410, e.g. femtocell access points, that connect to a core network 420 via a local area network such as an IP network 430.

The access point cluster may include two or more access points 410 that operate as a single system for access and use. The cluster of access points 410 define a coverage area 415 that is able to service mobile stations 418 within the coverage area 415. Peer to peer interaction, e.g. through the IP network 430, may provide call functions and soft handoff capability.

Figure 4:
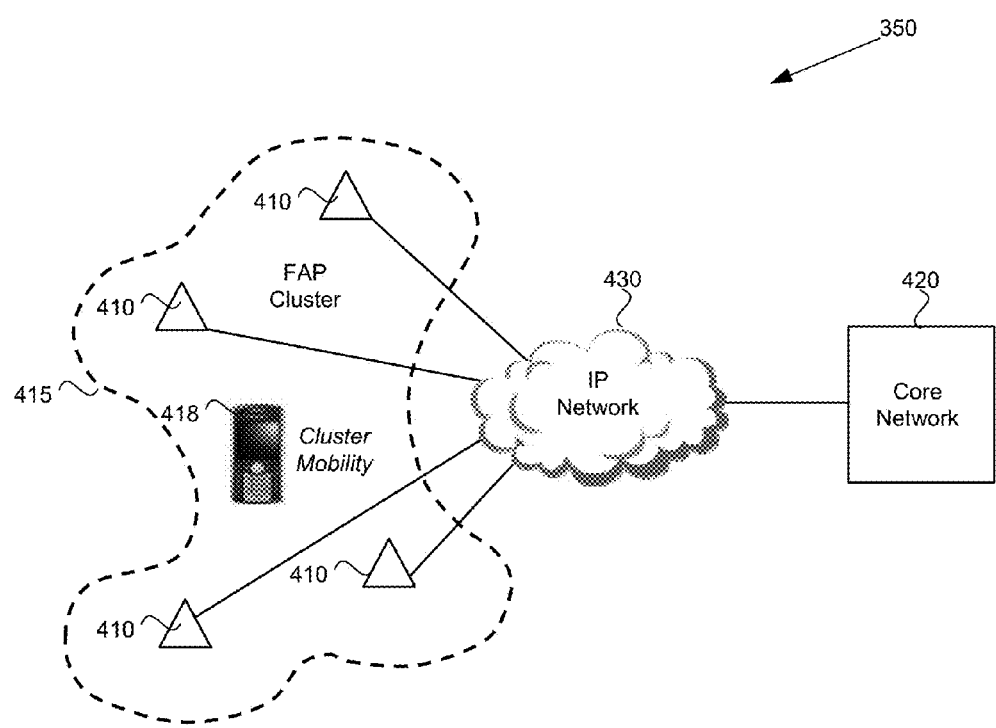
FIG. 4 is a simplified diagrammatic representation of a femtocell network having a cluster of femtocell access points.
Figure 5:
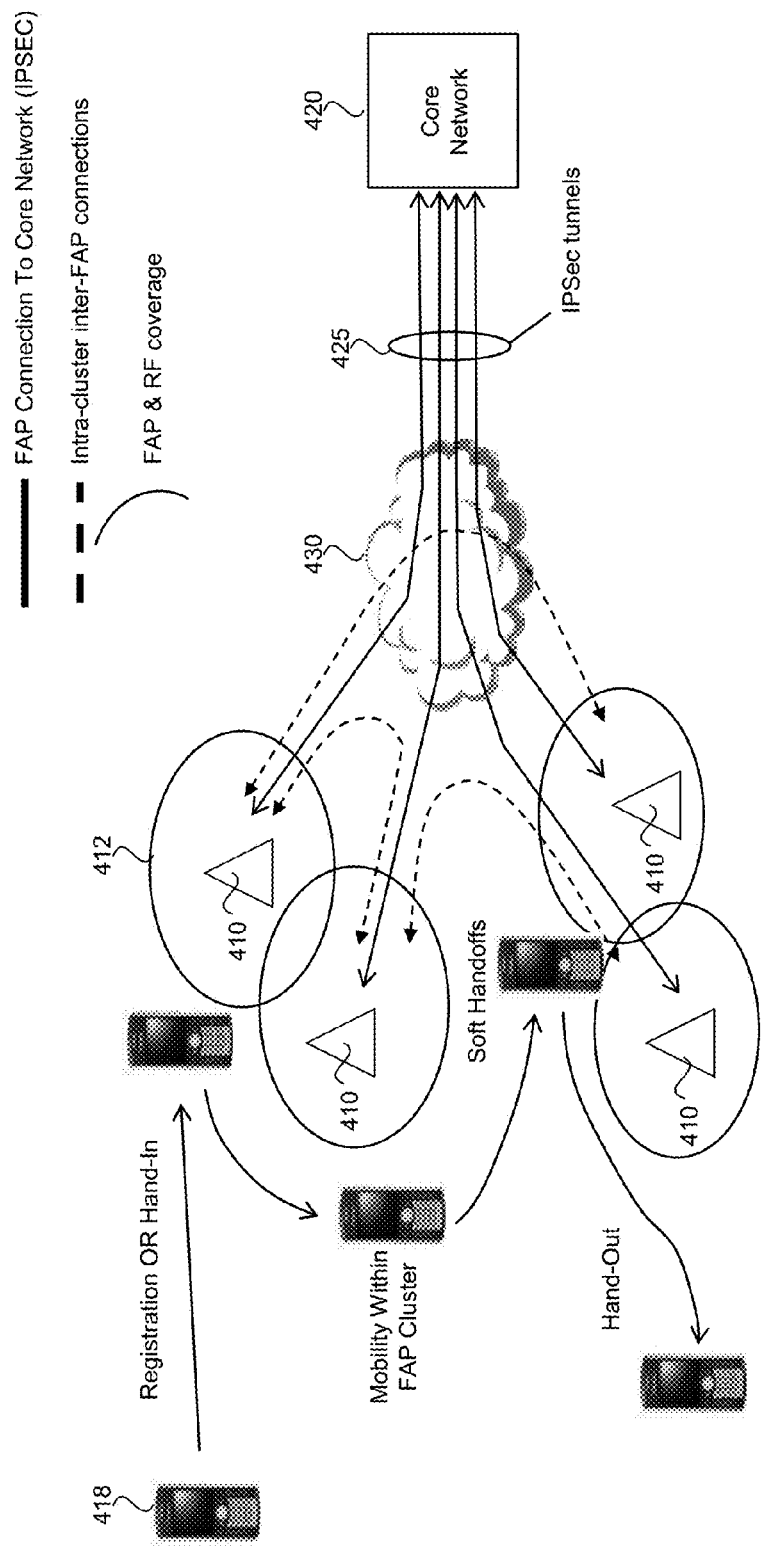
FIG. 5 is a diagrammatic representation of the femtocell network showing connections between the femtocell access points and the core network.

FIG. 5 shows the clustering topology and connections of the femtocell system of FIG. 4. Each access point 410, termed a femtocell access point (FAP) herein, connects to the core network 420 via an IPSec tunnel 425, similar to a conventional FAP implementation. Each FAP 410 may also have connectivity to adjacent FAP units 410 based on RF neighbors and to other non-adjacent FAPS via the local area network 430. These intra-cluster inter-FAP connections provide support for soft handoff and related mobility and to share registration data (described in more detail below). Thus, a mobile station 418 registered on one FAP 410 can be known to the rest of the cluster through processes to be described below.

Communications between the FAPS and the mobile stations can be via any suitable interface, such as the conventional 1xRTT or EVDO air interfaces. When a mobile station 418 moves within the coverage area 412 of a first FAP 410, the FAP 410 performs a hand-in process from the macrocell network. Once the mobile station 410 is registered within the cluster, the mobile station can move within the cluster and communicate through any of the cluster FAPs 410.

Figure 6:
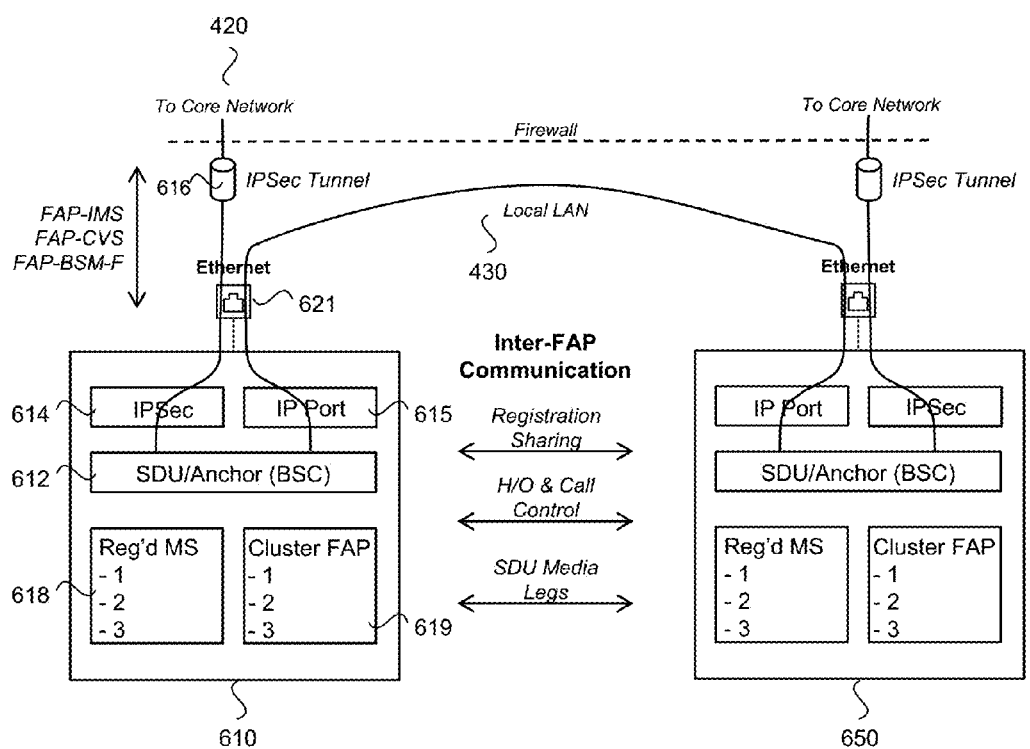
FIG. 6 schematically illustrates the components of a femtocell access point and inter-FAP communications.

Registration of the mobile stations and control of communications will now be described with reference to FIG. 6 which shows two FAPs for clarity, though any number of FAPs could be provided. Each FAP of the cluster is assigned the same location area identity or location area code.

Femtocell system 350 includes an antenna 410 coupled with a RN 412. RN 412 may be implemented, for example, as a 1xEV-DO ASIC device for provisioning a 1xEV-DO Rev. 0 air interface or a 1xEV-DO Rev. A air interface. RN 412 may be communicatively coupled with a RNC 414 that provides radio control functions, such as receiving measurements from MSs, control of handovers to and from other femtocell systems, and may additionally facilitate handoff to or from macrocells. RNC 414 may also provide encryption/decryption functions, power, load, and admission control, packet scheduling, and various other services.

Femtocell system 350 includes an electronic serial number screening function 416 that may facilitate approving or rejecting service for an MS by femtocell system 350. Additionally, femtocell system 350 includes an Internet Operating System (IOS) and SIP Adapter (collectively referred to as IOS-SIP Adapter 418). IOS-SIP adapter 418 may invoke and manage SIP clients, such as a user agent (UA) pool comprising one or more UAs. Each MS authorized to be serviced by femtocell system 350 may have a UA allocated therefor by femtocell system 350 in a manner that facilitates transmission of communications to and from an MS over an IP backhaul. Accordingly, when an authorized MS is within the femtocell system 350 site range, telecommunication services may be provided to the MS via the IP backhaul and the femtocell system 350 provisioned RAN. When the MS is moved beyond the service range of femtocell system 350, telecommunication service may then be provided to the MS via macrocellular coverage. Femtocell system 350 may perform a DNS/ENUM registration on behalf of MSs authorized to obtain service from femtocell system 350 and may generate and issue a SIP registration on behalf of an MS authorized for service access by the femtocell system 350.

Each FAP 610, 650 is provided with an ethernet port 621 that allows connection to the Core Network 420 and Local Area Network 430. The FAPs 610, 650 communicate with the Core Network 420 via an IPSec Tunnel 616, in accordance with known femtocell implementations. Thus, each FAP is provided with an IPSec module 614. Communication between the FAP and the Core Network may be through any suitable known protocol such as FAP-IMS, FAP-CVS or FAP-BSM-F In addition, each FAP is configured with an IP Port 615 for communicating with other FAPs of the cluster via a local area network 430 using IP protocols. For communication with the mobile stations, each FAP is provided with at least one BTS (not shown) controlled by a Service Data Unit (SDU) or BSC 612.

When a mobile station enters the coverage area of the cluster, it will be detected by one of the FAPs which will perform a hand-in process with the macrocell network. As part of the hand-in process, the hand-in FAP registers the mobile station with the Core Network 420 as being within the cluster. In the simplest embodiment, the detecting FAP registers the mobile station as being at the hand-in FAP. In other embodiments, the registration of the mobile station may be allocated to other FAPs in the cluster. This registration is maintained throughout the mobile stations presence within the cluster coverage area, despite mobility to other FAPs of the cluster as will be described below. The mobile station is considered to be anchored at registered FAP. The registered FAP will thus be termed the anchor FAP herein. Each FAP maintains a registration list 618 of mobile stations that are anchored at this FAP. This registration data may then be shared with other FAPs of the cluster through the local area network. In an alternative from, associations between mobile stations and their respective anchor access points may be stored in a common datastore, such as a central database, that can be accessed by many of the FAPs.

By anchoring the mobile station to a particular FAP, mobility of the mobile station within the cluster becomes transparent to the Core Network. That is, a cluster mobile station is registered in only the anchor FAP. Furthermore, because each of the cluster FAPs is configured with the same location area identity, the mobile station will not itself attempt re-registration as it moves between FAPs of the cluster. The cluster FAPs each maintain a cluster list 619 that identifies all FAPs within the cluster, thereby allowing sharing of information between FAPs, paging of mobile stations within the cluster, etc.

Figure 7:
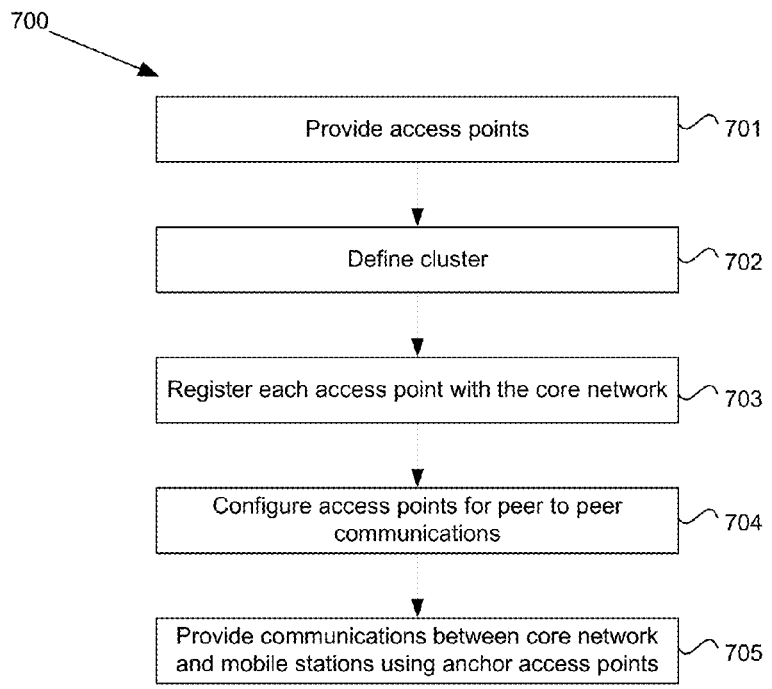
FIG. 7 illustrates a process for configuring the femtocell network.

A method for configuring the femtocell network will now be described with reference to the flowchart 700 of FIG. 7. At step 701, the femtocell access points are provided in an area requiring femtocell coverage and a cluster of the access points is defined (step 702), for example by providing each access point with a common location area code. Each access point is independently registered with the core network (step 703) and each access point of the cluster is configured for peer to peer communication with at least one other access point of the cluster (step 704). For example, each access point may be provided with a list of FAPs that form the cluster. The cluster list may indicate the ID and IP addresses of each of the FAPs, thereby allowing the FAPs to communicate with each other across the local area IP network using IP protocols. In addition, each cluster FAP also knows adjacent RF neighbors, which may be stored as a neighbor list (not shown). The cluster access points are thus configured to provide communications between mobile stations and the core network via the anchor FAPs associated with the mobile stations (step 705) as will be described in more details below.

Figure 8:
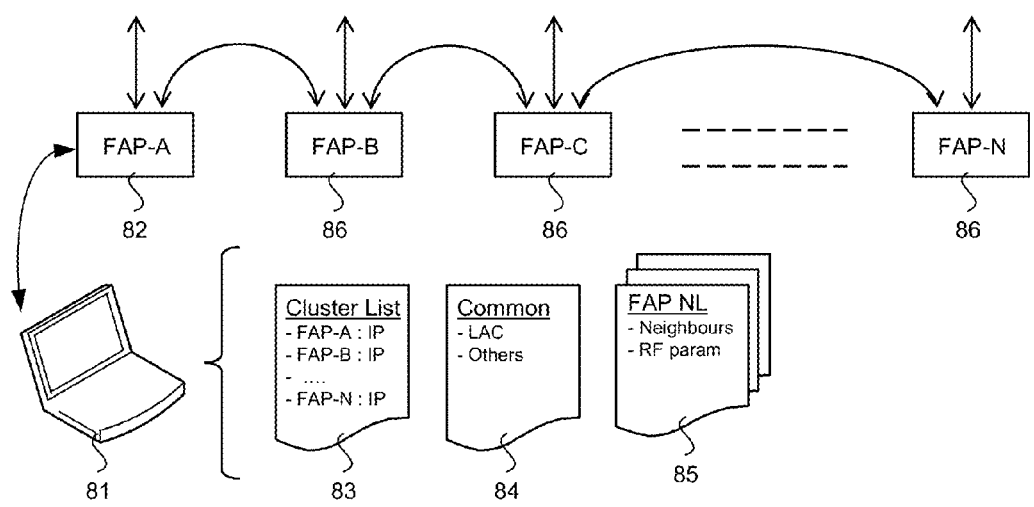
FIG. 8 illustrates a system for configuring the femtocell network.

In one embodiment, illustrated in FIG. 8, configuration data can be entered via a single entry point, e.g. from an administrator computer 81 to a first FAP 82. This configuration data, including a cluster list 83, configuration parameters 84 such as common LAC, etc, and a FAP neighbor list 85 can then be distributed from the first FAP 82 to each other FAP 86 in the cluster using the IP address list.

Figure 9:
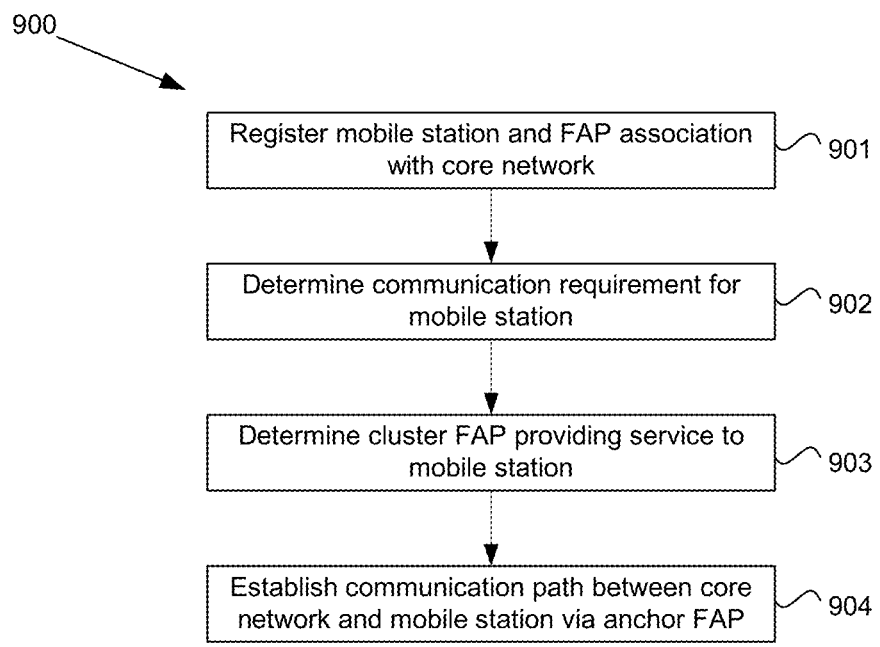
FIG. 9 illustrates a process for providing communications on the femtocell network.

A method for communicating on the femtocell network will now be described with reference to the flowchart 900 of FIG. 9. At step 901, an association between one or more mobile stations and their respective anchor FAPs stations may be registered or otherwise indicated to the core network. In one embodiment, the mobile stations are registered at hand-in from the macrocell network. A communication requirement for a mobile station may be identified at step 902. The communication requirement may be outbound, i.e. from the core network 420 to the mobile station 418 or inbound, i.e. originating from the mobile station 418. A cluster that is currently able to provide service to the mobile station is identified (step 903) and then a communication path is established between the core network and the mobile station via the anchor FAP (step 904). If the anchor FAP is the FAP that is servicing the mobile station, then the communication path may utilize only the anchor FAP. However, if the mobile station has migrated to a second FAP of the cluster, then the communication path will include the second FAP and the anchor FAP.

Because each FAP is independently registered with the core network, for outbound calls to the mobile station, the core network will first contact the anchor FAP because the anchor FAP is the FAP known to the core network for that mobile station. However, if the mobile station is not in the current contact list of the anchor FAP, i.e. not currently being serviced by the anchor FAP, then the anchor FAP may page the mobile station across the other cluster FAPs of the cluster network to identify the FAP currently servicing the mobile station.

For inbound communications from the mobile station, the origination may be directed from the currently servicing FAP to the anchor FAP and then call set-up may be performed between the anchor FAP and the core network.

The communications between FAPs will thus include registration sharing, handoff and call control as well as SDU media legs.

The step of identifying a FAP that is servicing the mobile station (step 903) may be performed passively, i.e. as part of idle mode mobility throughout the cluster network, as will be described in greater detail below. Alternatively, the mobile station may be paged in all instances, even where the anchor FAP is the servicing FAP.

In most embodiments, registration data may be shared across all FAPs of the cluster, though in some embodiments, the cluster may be configured to provide some restricted coverage by only sharing certain registrations with certain FAPs.

Figure 10:
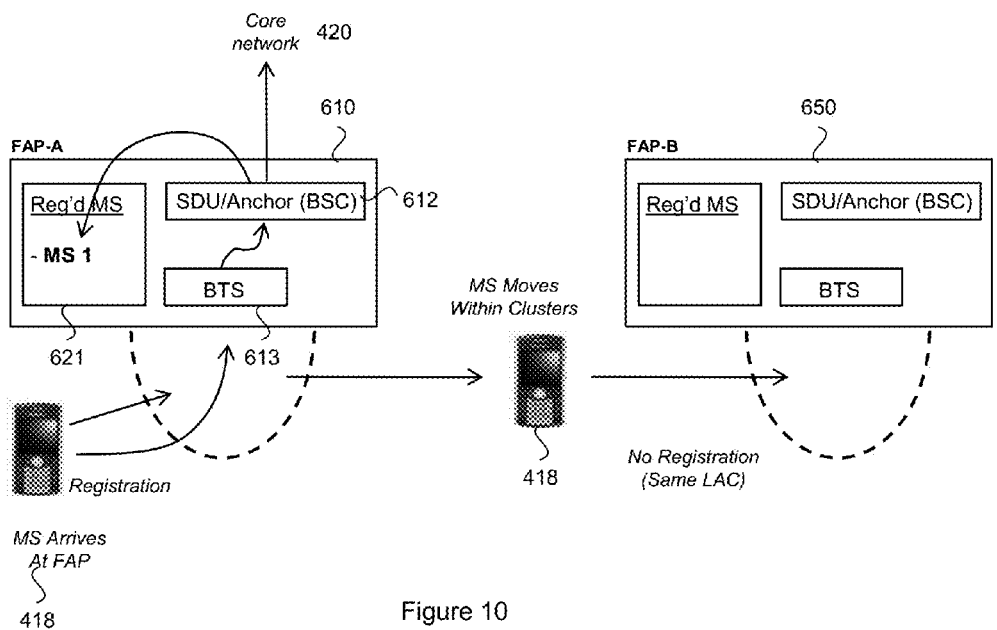
FIG. 10 schematically illustrates idle mode mobility between femtocell access points.

Registration and idle mobility will now be described in more detail with reference to FIG. 10. When a mobile station 418 moves into a region covered by the femtocell cluster, e.g. within the range of the BTS 613 of FAP-A 610, the mobile station 418 determines that registration is required and attempts registration on the cluster network. The registration requirement may be identified based on particular carrier implementations, for example by pilot beacon, different SID/NID etc. The mobile station 418 thus registers with the FAP 610 with which it first communicates, thereby defining this FAP as the anchor FAP. The registration is updated from the BSC 612 to the core network with the mobile station being anchored at this FAP. The registration is also stored in the registration list 621 of the anchor FAP 610. The registration value that may be stored may be some uniquely identifying parameter of the mobile station 418 such as an international mobile station identity (IMSI) or mobile identification number (MIN).

As the mobile station 418 moves throughout the coverage area in an idle mode (i.e. with no currently active communication), it may move out of the range of the anchor FAP 610 and into the range of a second FAP, e.g. FAP-B 650. However, since all FAPs within the cluster are configured with the same location area code, the location area code of any other cluster FAP will match the location area code currently registered on the mobile station 418 and thus the mobile station 418 does not identify a need to re-register its mobility with the core network. Thus, from a core network perspective, the mobile station remains anchored at the anchor FAP, FAP-A 610.

Figure 11:
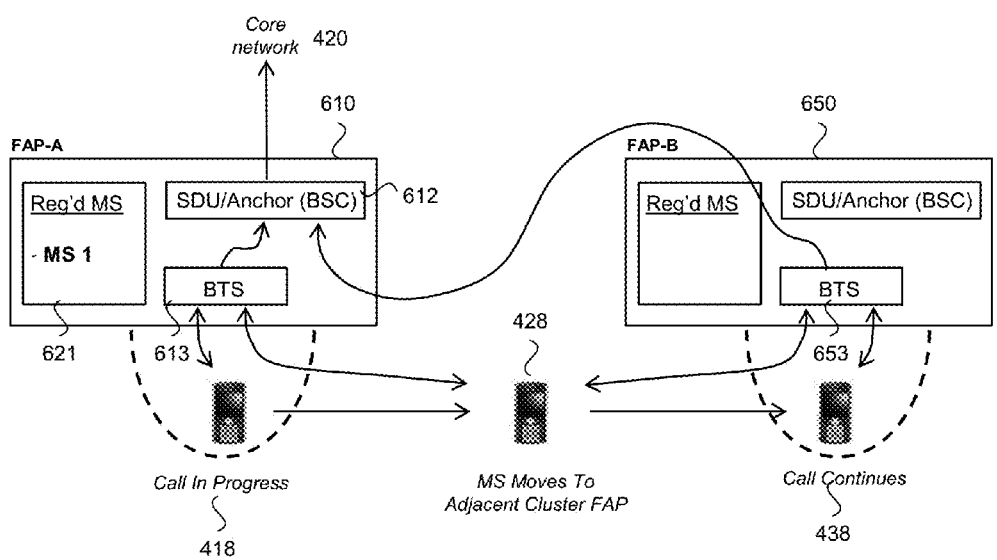
FIG. 11 schematically illustrates active mode handoff between femtocell access points.

Full soft handoff can be supported on the cluster network using multiple legs set-up to the anchor FAP. FIG. 11 shows the process of handoff during an active mode. Initially, a call-in-progress to mobile station 418 is connected via the BTS 613 and BSC 612 of FAP-A 610, which in the example shown is the anchor FAP, but need not be. During the call, the mobile station 418 moves towards the coverage area of FAP-B 650, as depicted by mobile station 428. As the signal strength from FAP-A 610 decreases, the mobile station 428 requests soft handoff to another FAP based on the neighbor list provisioned by the FAP cluster and stored on the FAP 610. Consequently, FAP-A 610 and FAP-B 650 set-up a soft handoff leg. As a part of the soft handoff process, the BTS 653 of FAP-B establishes a connection through the LAN with the BSC 612 of the anchor FAP, FAP-A 611 (or, if FAP-A was not the anchor FAP, then the actual anchor FAP). As the mobile station continues to move towards FAP-B, depicted by mobile station 438, the soft handoff process completes. At some time, the legs to the BTS 613 of FAP-A 610 are determined to be no longer required and are subsequently dropped and the mobile station 438 continues the call through FAP-B 650. However, the connection between the anchor FAP and the core network is unaffected by the handoff process and thus the connection path to the core network will always be maintained via the anchor FAP. Thus, this process allows mobility of the mobile station throughout the cluster network.

Call origination (inbound) will now be described with reference to FIG. 12. A mobile station 418 within the service area of its anchor FAP, e.g. FAP-A 610, originates a communication requirement at the anchor FAP. The anchor FAP recognizes the mobile station as registered on the FAP, via the registration list 621 and so SDU resources are allocated by the BSC 612 and the communication origination is routed to the core network. If the mobile station is outside of the service area of the anchor FAP, e.g. within the service area of FAP-B 650 as depicted by mobile station 448, then when the mobile station 448 originates the call with the BTS 653 of FAP-B 650, FAP-B will not recognize the mobile station as being anchored to this FAP. That is, the mobile station 448 is not on the local registration list 661, and thus FAP-B will communicate with the other cluster FAPs via the IP network to validate the mobile station and determine the anchor FAP for the mobile station. In an alternative form, a priori communications between the cluster FAPs to share registration data can be stored in the local FAPs so that FAP-B is already aware, via a local list, that the mobile station 448 is anchored to FAP-A 610.

Having determined the anchor FAP as FAP-A 610, legs will be set-up to connect the BTS 653 of FAP-B 650 to the SDU/BSC 612 of FAP-A 610, allowing the connection to be completed from the SDU/BSC 612 of FAP-A 610 to the core network.

Figure 13:
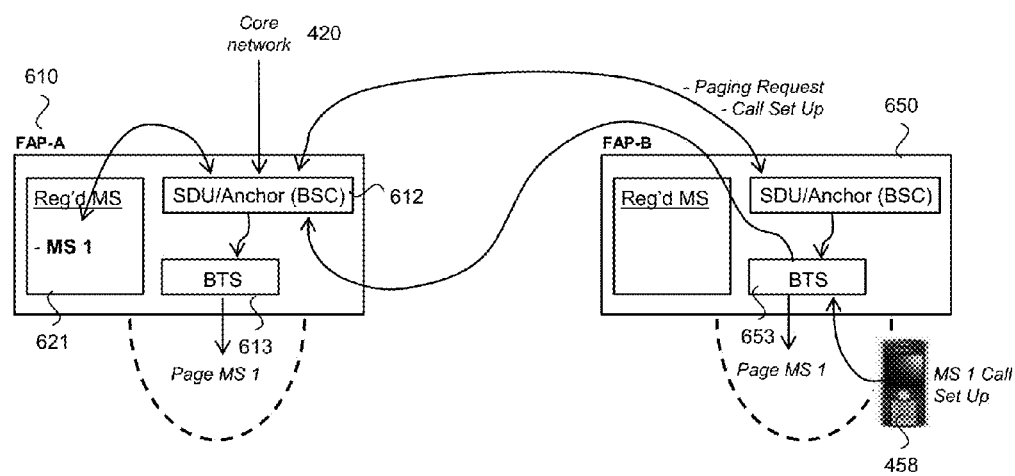
FIG. 13 schematically illustrates call termination for a mobile station at a non-anchor access point.

Call termination (outbound) will now be described with reference to FIG. 13. When an outbound communication requirement exists for a mobile station 458 in the cluster environment, call termination to the mobile station 458 is set up from the core network 420 to the anchor FAP 610 due to the association between the mobile station 448 and the anchor FAP 610 that was registered on the core network 420 at the initial hand in and the presence of the mobile station 448 in the registration list 621 of the anchor FAP 610. Call set-up is thus initially performed between the BSC 612 of anchor FAP 610 and Core Network 420 through IP SEC tunnel (not shown), as would be performed in a prior art Femtocell system that does not support clustering.

The anchor FAP 610 then sets up cluster wide paging for the mobile station. If the mobile station 448 is at a non-anchor FAP, e.g. FAP-B 650, then the mobile station 448 responds to the page at the BTS 653 of FAP-B 650 and FAP-B 650 arranges leg connection to the anchor FAP-A SDU 612, allowing the remainder of the call to the core network 420. Ringing of the mobile station and answering of the call may then proceed normally.

The process of cluster wide paging will typically occur for all call termination requirements of the mobile station, including when the mobile station is at its anchor FAP, because the location of the mobile station will not generally be known at any one time.

While it has been described above that a mobile station is anchored to a particular FAP, e.g. the hand-in FAP, throughout its presence in the cluster service area, there are times when one or more FAPs may become overloaded while other FAPs remain relatively unutilized. Such a situation may commonly arise, for example, in an enterprise cluster where users enter a building through a common entrance and thus the first entry into the cluster network is via a FAP that provides coverage to the entrance area. Once within the building however, the users will typically disperse to other areas of the cluster environment that are covered by other FAPs.

Figure 14:
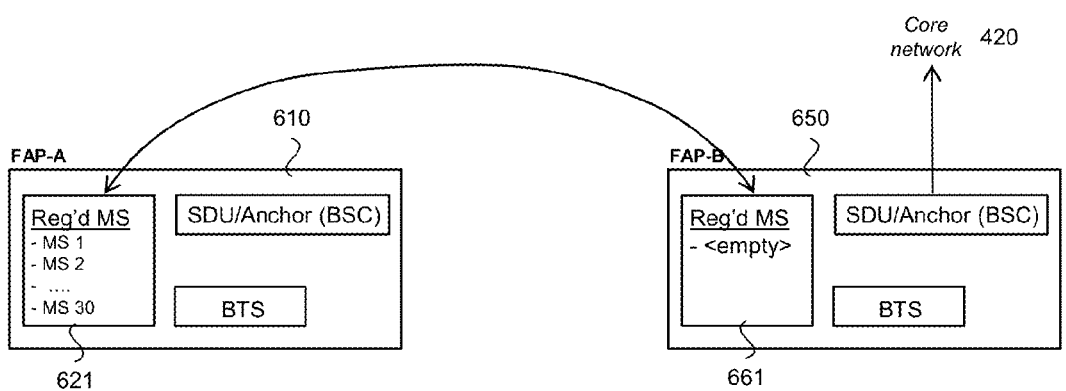
FIG. 14 schematically illustrates registration redistribution between femtocell access points.

It may therefore be necessary to occasionally or periodically redistribute the anchoring of one or more mobile stations from an overloaded FAP to a less loaded FAP. An auto load distribution process will now be described with reference to FIG. 14. At the initial state illustrated, the registration list 621 of FAP-A contains a large number of mobile stations while the registration list 661 of FAP-B 650 is empty (or contains few entries). Any communications under this configuration would thus require core network connections from FAP-A which may suffer capacity constraints. An Inter-FAP communication can be generated to determine the state of the registration lists of each of the cluster FAPs.

Figure 12:
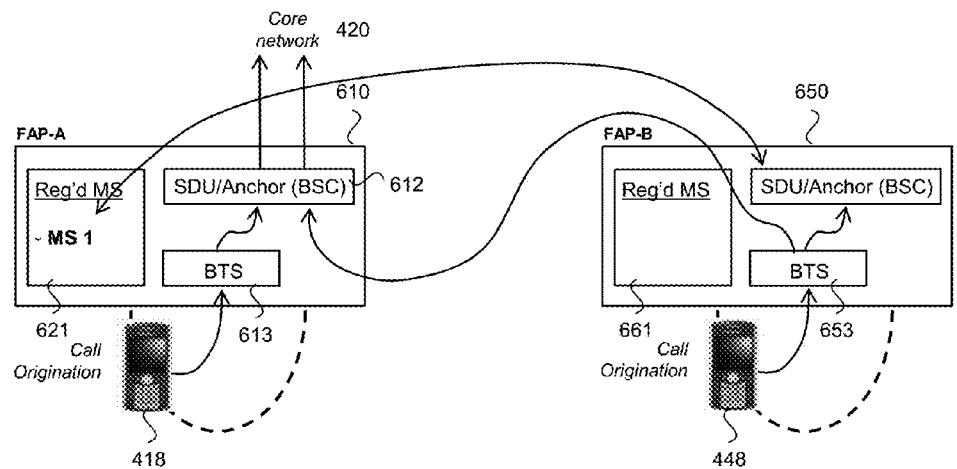
FIG. 12 schematically illustrates call origination from a mobile station on both an anchor access point and a non-anchor access point.

If an imbalance is detected, in particular where one or more of the FAPs is close to reaching capacity, registrations can be transferred from an overloaded FAP to an underutilized FAP, e.g. from FAP-A 610 to FAP-B 650 in the scenario of FIG. 12. When FAP-B 650 receives the transferred registrations, FAP-B 650 stores the mobile station identifiers in the registration list 661 of FAP-B 650 and initiates registration of these mobile stations at FAP-B 650 with the core network 420. Mobile involvement may not be required in the registration transfer process if the core network 420 can accept the anchor point transfer without authentication. Otherwise, the transferred mobile stations are paged to re-register with the core network. In an alternative form, load balancing may be performed by sequentially re-registering mobile stations at different FAPs until sufficient load balancing occurs.

From a core network perspective, each FAP unit independently connects and registers with the core network, whether in the cluster or not. This eliminates any impact of clusters on the core network and allows easier cluster growth. In particular, registering each FAP independently with the core network removes the need to provide a cluster gateway, which could potentially burden the installation and deployment and add unnecessary cost.

It is known for FAP units to perform auto-configuration independently based on RF measurements to take into account any locally detected cells, to minimize interference etc. In the cluster embodiments herein described, a cluster auto-configuration may differentiate between cluster and non-cluster emitters. Non-cluster emitters may include macro emitters, e.g. of the macro cellular network, as well as other Femto emitters. Configuration objectives for cluster FAPs will generally differ from non cluster arrangements of FAPs with complementary objectives typically taking precedence over standard femtocell objectives such as interference protection. One such complementary objective is permitting soft handover overlaps between cluster FAPs.

A feature of the cluster network that may be enabled is the provision of mobile assisted auto-configuration. Results of specific measurement requests from the FAPs to a mobile station can be used to assist the auto-configuration, in particular for setting of handoff parameters.

Applications of the clustering concept may include enterprise femtocells, SOHO (mid-tier) femtocells and large venues and buildings, and the like. Macro and/or pico applications may also exist, such as large venues and buildings, remote coverage islands, vessels and transportation equipment and the like.

The cluster system has advantage over prior art femtocell systems by being more readily and cheaply expandable. Coverage may be expanded by adding access points to the cluster, each being independently connected to the core network. In particular, because all access points of the cluster are provided under a single location area identity, the addition of access points to the cluster can be provided without any additional burden on the convergence server, MSC or other core elements.

A further advantage is that because each element of the cluster is independently connected to the core network, no common single point gateway is required to interface the FAPs to the core network.

The above described embodiments refer specifically to femtocell applications. However other applications are possible the embodiments may be implemented in many situations where radio access network devices provide an over-air interface allowing mobile stations to communicate with a core network via an IP network.

While the term "call" has been used in the specific embodiments described above to denote the communication between the mobile station and the core network, a person skilled in the art will recognize that the systems and methods described are equally applicable to various communication requirements. All such communication requirements are intended to be encompassed by the term "call" and its derivatives, including voice calls, multimedia calls, internet communications, text communications, etc.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
   providing, via a plurality of access points, radio network access to at least one mobile station;
   communicating, via the plurality of access points, with a core network;
   wherein at least one of the plurality of access points is configured to:
      register the mobile station at an access point with the core network, the access point defining an anchor access point for the respective mobile station;
      defining a cluster of the plurality of access points; and
      configuring the plurality of cluster access points to:
         establish a communication path between the mobile station and the core network via the anchor access point, the communication path comprising a link between the anchor access point and the access point of the cluster that is servicing the mobile station when a communication requirement exists.

2. The method according to claim 1 comprising maintaining the registration of a mobile station with its respective anchor access point during mobility of the mobile station throughout the plurality of coverage areas of the access points of the cluster.

3. The method according to claim 1 comprising configuring the plurality of access points of the cluster for peer to peer communication through a local area IP network, wherein establishing a communication between the mobile station and the core network comprises establishing a communication between a servicing access point and the anchor access point on the local area IP network.

4. The method according to claim 3 comprising providing one or more configuration parameters of the cluster to a first access point and distributing the one or more configuration parameters from the first access point to the access points of the cluster on the local area IP network.

5. The method according to claim 1 comprising configuring each access point of the cluster with a common location area code.

6. The method according to claim 1 comprising:
   associating a mobile station that is registered with a first access point with a second access point; and
   indicating to the core network that the mobile station is associated with the second access point.

7. The method according to claim 1 comprising:
   providing a measurement request to a mobile station within at least one of the coverage areas;
   receiving a measurement response from the mobile station at at least one access point; and configuring at least one handoff parameter for the at least one access point dependent on the measurement response.

8. The method according to claim 1 comprising storing an association between the mobile station and the anchor access point within the network.

9. The method according to claim 1 comprising configuring each access point of the cluster for peer to peer communication with at least one other access point of the cluster.

10. The method according to claim 1 wherein the communication path is established between the mobile station and the core network via the anchor access point irrespective of an access point of the cluster that is servicing the mobile station.

11. The method according to claim 1 wherein radio network access is provided via an air interface to the at least one mobile station.

12. The method according to claim 1 wherein the at least one of the plurality of access points is configured to perform a hand-in of the mobile station from the macrocell network.

13. The method according to claim 12, wherein the hand-in of the mobile station from the macrocell network comprises the registering of the mobile station at the hand-in access point with the core network.

14. The method according to claim 13, wherein the hand-in access point defines the anchor access point for the respective mobile station.

15. The method according to claim 12, wherein each access point of the cluster is independently registered with the core network.

16. The method according to claim 12, wherein the anchor point for the at least one mobile station is identified when a communication requirement between the core network and the mobile station exists.

17. A system, comprising:
a plurality of physical access points defining a cluster of physical access points, each access point comprising a common location area code and configured to:
provide radio network access to at least one mobile station;
communicate with a core network;
at least one of the access points of the cluster being configured to perform:
associating the mobile station and an access point of the cluster, the associated access point defining a physical anchor access point for a mobile station of the at least one mobile station;
determine a communication requirement for the mobile station; and
establish a communication path between the mobile station and the core network via the anchor access point, the communication path comprising a link between the anchor access point and a servicing access point of the plurality of cluster access points that is currently servicing the mobile station when the communication requirement exists.

18. The system according to claim 17 wherein at least one of the cluster access points is configured to perform at least one of:
provide an anchor access point for the mobile station;
receive a communication request to the mobile station from the core network;
page the mobile station across the access points of cluster;
identify a servicing access point of the access points of the cluster that is able to service the mobile station;
establish one or more legs between the anchor access point and the servicing access point.

19. The system according to claim 17 wherein at least one of the cluster access points is configured to perform at least one of:
receive a communication request from the mobile station, thereby defining the access point as a servicing access point;
communicate with one or more access points of the cluster to identify the anchor access point for the mobile station;
establish one or more legs between the servicing access point and the anchor access point;
determine a handoff requirement during communication between the mobile station and the core network; and
perform a handoff comprising:
identifying a handoff access point of the cluster;
hand off the communication to the handoff access point;
wherein the handoff access point is configured to:
establish one or more legs between the handoff access point and the anchor access point; and
continue the communication on a communication path comprising the handoff access point and the anchor access point.

20. A non-transitory computer readable storage medium comprising instructions that, when read by a processor, cause the processor to perform:
providing, via a plurality of access points, radio network access to at least one mobile station;
communicating, via the plurality of access points, with a core network;
wherein at least one of the plurality of access points is configured to:
register the mobile station at an access point with the core network, the access point defining an anchor access point for the respective mobile station;
defining a cluster of the plurality of access points; and
configuring the plurality of cluster access points to:
establish a communication path between the mobile station and the core network via the anchor access point, the communication path comprising a link between the anchor access point and the access point of the cluster that is servicing the mobile station when a communication requirement exists.

* * * * *